(12) United States Patent
Huang et al.

(10) Patent No.: US 12,256,150 B2
(45) Date of Patent: *Mar. 18, 2025

(54) SCALE-DOWN CAPTURE PREVIEW FOR A PANORAMA CAPTURE USER INTERFACE

(71) Applicant: Google LLC, Mountain View, CA (US)

(72) Inventors: Lawrence Chia-Yu Huang, Santa Clara, CA (US); Carsten Hinz, Munich (DE); Chorong Hwang Johnston, Mountain View, CA (US); Mike Ma, San Jose, CA (US); Isaac William Reynolds, Longmont, UT (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,158

(22) Filed: Apr. 1, 2024

(65) Prior Publication Data

US 2024/0251169 A1 Jul. 25, 2024

Related U.S. Application Data

(63) Continuation of application No. 17/277,960, filed as application No. PCT/US2019/053126 on Sep. 26, 2019, now Pat. No. 11,949,990.

(60) Provisional application No. 62/741,730, filed on Oct. 5, 2018.

(51) Int. Cl.
*H04N 23/698* (2023.01)
*H04N 23/60* (2023.01)
*H04N 23/63* (2023.01)

(52) U.S. Cl.
CPC ......... *H04N 23/698* (2023.01); *H04N 23/631* (2023.01); *H04N 23/633* (2023.01); *H04N 23/64* (2023.01)

(58) Field of Classification Search
CPC .. H04N 23/698; H04N 23/633; H04N 23/631; H04N 23/64; H04N 23/62
See application file for complete search history.

(56) References Cited

U.S. PATENT DOCUMENTS

| 10,021,295 B1* | 7/2018 | Baldwin | H04N 23/698 |
| 2004/0189849 A1 | 9/2004 | Hofer | |
| 2005/0189419 A1 | 9/2005 | Igarashi et al. | |
| 2007/0025723 A1 | 2/2007 | Baudisch et al. | |

(Continued)

FOREIGN PATENT DOCUMENTS

| CN | 101228477 B | 12/2010 |
| CN | 104364712 A | 2/2015 |

(Continued)

OTHER PUBLICATIONS

Boiarshinov, Dmitrii, 'Improving Autofocus Speed in Macrophotography Applications, Technical Disclosure Commons, https://www.dcommons.org/dpubsseries/5133, May 11, 2022, 9 pages.

(Continued)

*Primary Examiner* — Kathleen V Nguyen
(74) *Attorney, Agent, or Firm* — McDonnell Boehnen Hulbert & Berghoff LLP

(57) ABSTRACT

This document describes apparatuses and techniques enabling a scale down capture preview for a panorama capture user interface. This scale down preview enables users to more-easily and more-accurately capture images for a panorama.

19 Claims, 13 Drawing Sheets

(56) References Cited

U.S. PATENT DOCUMENTS

| | | | |
|---|---|---|---|
| 2009/0021576 A1 | 1/2009 | Linder et al. | |
| 2009/0251565 A1* | 10/2009 | Molgaard | H04N 1/3878 |
| | | | 348/222.1 |
| 2013/0076661 A1 | 3/2013 | Reeves et al. | |
| 2013/0101163 A1 | 4/2013 | Gupta et al. | |
| 2013/0155280 A1 | 6/2013 | Donatelli et al. | |
| 2013/0314558 A1 | 11/2013 | Ju et al. | |
| 2018/0101297 A1 | 4/2018 | Yang et al. | |
| 2018/0137329 A1 | 5/2018 | Kim et al. | |
| 2019/0037138 A1* | 1/2019 | Choe | H04N 23/698 |
| 2021/0329150 A1 | 10/2021 | Wang et al. | |

FOREIGN PATENT DOCUMENTS

| | | |
|---|---|---|
| CN | 103294328 B | 11/2016 |
| WO | 2014004210 A1 | 1/2014 |
| WO | 2020072267 A1 | 4/2020 |

OTHER PUBLICATIONS

Chinese National Intellectual Property Administration, Office Action mailed Jan. 6, 2022, issued in connection with Chinese Patent Application No. 201980057539.1, 16 pages.

Hollister, Sean, "How to guarantee the iPhone 13 Pro's macro mode is on," The Verge, Retrieved at: https://www.theverge.com/22745578/iphone-13-pro-macro-mode-how-to, Oct. 26, 2021, 11 pages.

Intellectual Property India, Office Action mailed on Feb. 4, 2022, issued in connection with Indian Patent Application No. 202147015933, 6 pages.

International Bureau, International Preliminary Report on Patentability issued Mar. 23, 2021, in connection with International Patent Application No. PCT/US2019/053126, filed Sep. 26, 2019, 8 pages.

International Searching Authority, International Search Report and Written Opinion mailed Nov. 19, 2019, issued in connection with International Patent Application No. PCT/US2019/053126, filed Sep. 26, 2019, 13 pages.

Konstantinova et al., "Fingertip Proximity Sensor with Realtime Visual-based Calibration," IEEE/RSJ International Conference on Intelligent Robots and Systems (IROS), Oct. 2016, 6 pages.

Sammoura et al., "Fingerprint-Matching Algorithm Using Polar Shapelets," Technical Disclosure Commons; Retrieved from https://www.tdcomrnons.org/dpubs_series/2471, Sep. 10, 2019, 17 pages.

Shaikh, Rezaullah, "Samsung is Patenting a Mobile Phone with Multi-Plane Display," Damzone, Retrieved from https://darnzone.com/blog/samsung-is-patenting-a-mobile-phone-with-multi-plane-display, Apr. 29, 2019, 6 pages.

Thorp et al., "Classifying and Separating Messages, Alerts, and Notifications," Technical Disclosure Commons, Retrieved from https://www.tdcomrnons.org/dpubs_series/2559, Oct. 10, 2019, 14 pages.

* cited by examiner

SCALE-DOWN CAPTURE PREVIEW FOR A PANORAMA CAPTURE USER INTERFACE

This application is a continuation of U.S. patent application Ser. No. 17/277,960, filed Mar. 19, 2021, which is a national stage application under 35 U.S.C. § 371 of International Application No. PCT/US2019/053126, filed Sep. 26, 2019, which claims priority to U.S. Provisional Patent Application No. 62/741,730, filed Oct. 5, 2018, the disclosures of which are explicitly incorporated by reference herein in their entirety.

BACKGROUND

Mobile computing devices, such as smartphones, commonly include cameras, which enable users to capture still images, videos, and in many cases panoramas. A panorama is a still image made up of multiple images, often to show a horizon, a tall building, or an all-around view of a user's location. Because multiple images are needed, mobile computing devices interact with users through a user interface (UI) to help those users take multiple image captures. These multiple image captures are then "stitched" into the final panorama. Current user interfaces for capturing panoramas, however, suffer from multiple problems, both from a user's perspective and from the mobile computing device's inability to provide a high-quality final panorama.

SUMMARY

This document describes apparatuses and techniques enabling a scale down capture preview for a panorama capture user interface. This scale down preview enables users to more-easily and more-accurately capture images for a panorama.

In some aspects, a method is described. The method includes providing, at least in part through a display of a mobile computing device, a panorama capture user interface (UI). The method then receives selection, through the panorama capture UI, to capture images through which to create a panorama image, the received selection effective to cause the mobile computing device to begin an image-capture process, the image-capture process capturing images through which to create the panorama image, the image-capture process having a first portion capturing first images and a second portion capturing second images, the first portion prior to the second portion. Following this selection, the method presents, through the panorama capture UI and on the display during the image-capture process, one or more of the first images captured during the first portion of the image-capture process, the presenting of the first images at a first size. The method then presents, through the panorama capture UI and on the display during the image-capture process, one or more of the second images of the second portion of the image-capture process, the presentation of the second images of the second portion of the image-capture process presented at a second size, the second size smaller than the first size at which the first images were presented. Optionally, the method may then receive selection, through the panorama capture UI, to cease the image-capture process or to create the panorama from the captured images. The method optionally passes the captured images to an image-stitching module effective to create the panorama image.

In another aspects, a mobile computing device is described. The mobile computing device includes a camera, a display, a processor, and computer-readable storage media that, upon execution by the processor, cause the mobile computing device to perform operations of the method described above.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of techniques and apparatuses enabling a scale down capture preview for a panorama capture user interface. The use of the same reference numbers in different instances in the description and the figures may indicate like elements:

FIG. 5 also shows a detail with a guide box having a slight cant.

FIG. 6 also shows a detail with a guide box at a high cant.

FIG. 7 also shows a detail with a guide box indicating that a change to an up-and-down position is needed.

FIG. 8 also shows a detail with a guide box indicating that a change to a speed at which to move the mobile computing device is requested.

FIG. 9 also shows a detail with a guide box indicating that a change to an up-and-down position is needed.

FIGS. 13-1 and 13-2 illustrate details showing a vertical panorama capture user interface and preview, respectively.

DETAILED DESCRIPTION

Overview

This document describes apparatuses and techniques enabling a scale down capture preview for a panorama capture user interface. This scale down preview enables users to more-easily and more-accurately capture images for a panorama.

Consider, for example, a conventional panorama user interface (UI) in which images taken for a panorama are shown at a small size in a narrow band. These UIs begin the capture process showing a black band, which has a narrow height, and then images captured are placed in the narrow black band as the capture process is performed. This narrow band shows captured images in such a small size that the presentation is not particularly useful to the user. Because of the small size, the user may not accurately move the mobile computing device's camera to capture the desired panorama.

Furthermore, this conventional UI may fail to properly guide users to move the mobile computing device in a manner that provides good images from which to create the panorama. If the user goes too slow, resources of the computing device can be wasted, and if too fast, the panorama may lack resolution. Further still, if the UI fails to guide users in how to maintain a consistent up-and-down position or a proper "cant," the panorama from those captured images may not be a desired horizontal or may lack resolution at upper and lower regions of the panorama. These are but a few of the failings a scale down capture preview for a panorama capture user interface can correct.

For example, the described scale down capture preview can present captured images at relatively large sizes and then, as additional images are captured, present them progressively smaller. By so doing, users are presented with a preview that is large enough to be useful for facilitating accurate control of the mobile capture device during panorama capture. Further, the described techniques can guide a user in how to move and handle the mobile computing device, thereby potentially correcting, in an easy-to-use way, image canting, captures that are positioned too high or too low, movement that is too slow or too fast, and so forth. It will be appreciated therefore that both the scale down capture preview and the described techniques for guiding the user in how to move and handle the mobile computing device may serve to assist the user in performing the technical task of accurate panoramic image capture by means of a continued (and in some examples guided) human-machine interaction process. In some examples, the scale down capture preview may represent a good (or even optimal) balance between displaying the preview at a large size (so as to facilitate accurate capture), while also displaying as much of the panorama preview as possible.

Example Environment

Figure 1:
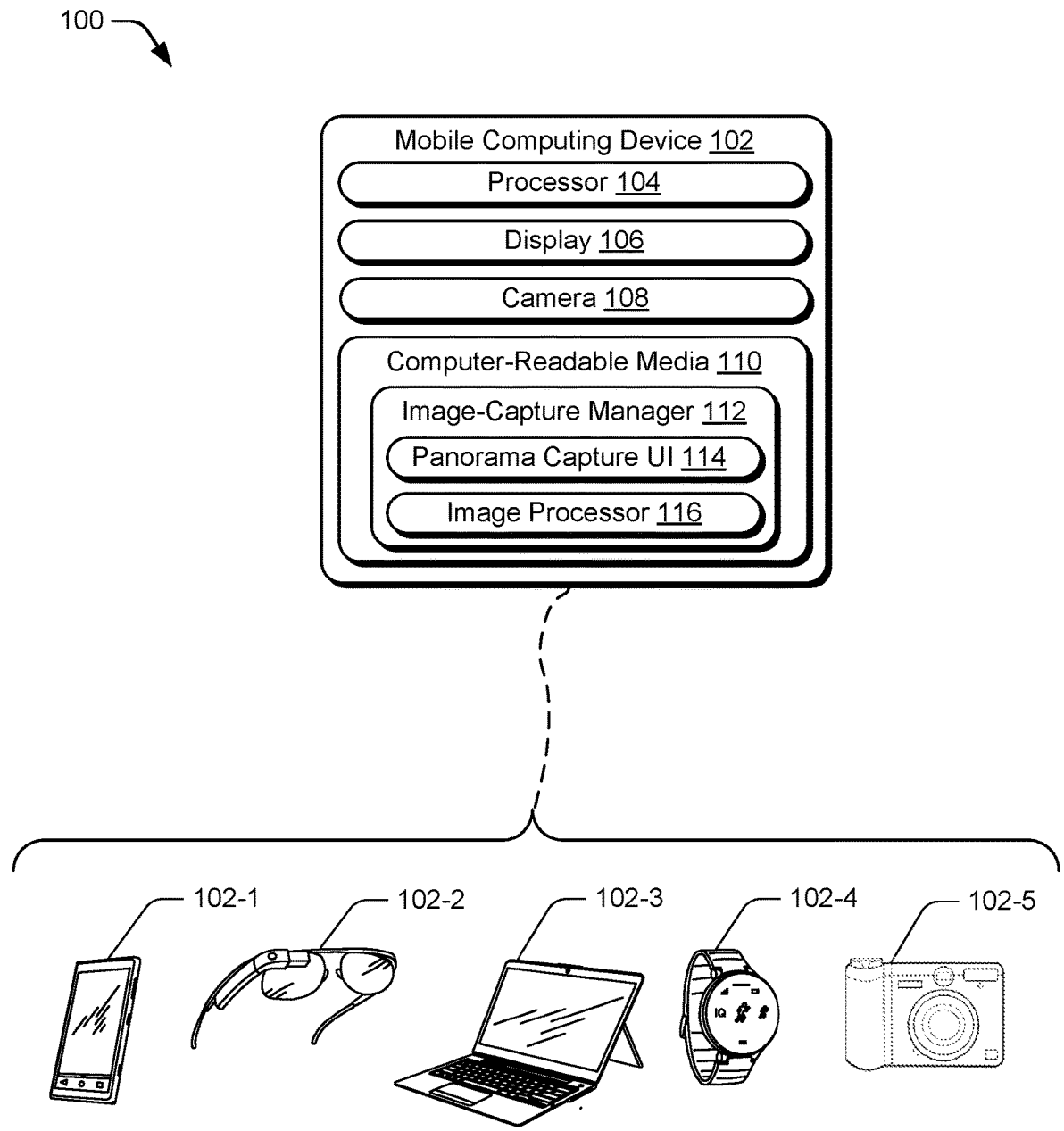
FIG. 1 illustrates an example operating environment in which a mobile computing device enables a scale down capture preview for a panorama capture user interface.

FIG. 1 illustrates an example operating environment 100 in which a mobile computing device 102 enables scale down capture preview for a panorama capture user interface. The operating environment 100 includes the mobile computing device 102 along with example configurations, including a smartphone 102-1, computing spectacles 102-2, a laptop 102-3, a wearable computing device 102-4, and a digital camera device 102-5, though any computing device that is both mobile and can capture images is contemplated.

The mobile computing device 102 includes a processor 104, a display 106, a camera 108, and one or more computer-readable storage media (CRM) 110. In some cases, the processor 104 is an application processor (e.g., multicore processor) or a system-on-chip (SoC) with other components of the mobile computing device 102 integrated therein. The CRM 110 may include any suitable type of memory media or storage media, such as read-only memory (ROM), programmable ROM (PROM), random access memory (RAM), static RAM (SRAM), or Flash memory. The CRM 110 may also store modules of code or executable instructions in the form of an image-capture manager 112, which is shown having a panorama capture user-interface module 114 (panorama capture UI 114) and an image processor 116.

Generally, the image-capture manager 112 manages still, video, and panorama image captures. The image-capture manager 112 may manage image and audio captures in various manners, such as through use of sensor data (e.g., accelerometer, gyroscope, ambient light sensor, and so forth), as well as resource management, such as processor and memory of the mobile computing device 102. The panorama capture UI 114 provides a panorama capture user interface by which images are presented on the display 106 at various sizes, such images starting large and progressing smaller as additional images are captured. As noted below, the panorama capture UI 114 may do so in steps, progressively reducing sizes, or in a three-dimensional (3D) view in which images captured may scale from large to medium to large again. The panorama capture UI 114 optionally also guides a user to aid in how to move and handle the mobile computing device 102, such as to avoid "cant," orienting too high or too low, moving too slow or too fast, and so forth. The image processor 116 is configured to process the captured images (e.g., "stitch") to create a panorama image.

The operating environment 100 also may include a remote computing device (not shown) that connects to the mobile computing device 102 via a network. By so doing, images can be provided to the remote computing device for use to create a panorama should the mobile computing device 102 not be used to do so, or a panorama created by the mobile computing device 102 may provide the panorama for storage and/or use by the remote computing device. Thus, the image processor 116 may operate wholly on the mobile computing device 102, wholly on the remote computing device, or partially on both of these devices. The network, also not shown, may include one or more of, for example, a Wi-Fi connection to a Wi-Fi network, a wired connection to Local Area Network (LAN), and a wireless mobile connection (e.g., a cellular network).

Example Method

Figure 2:
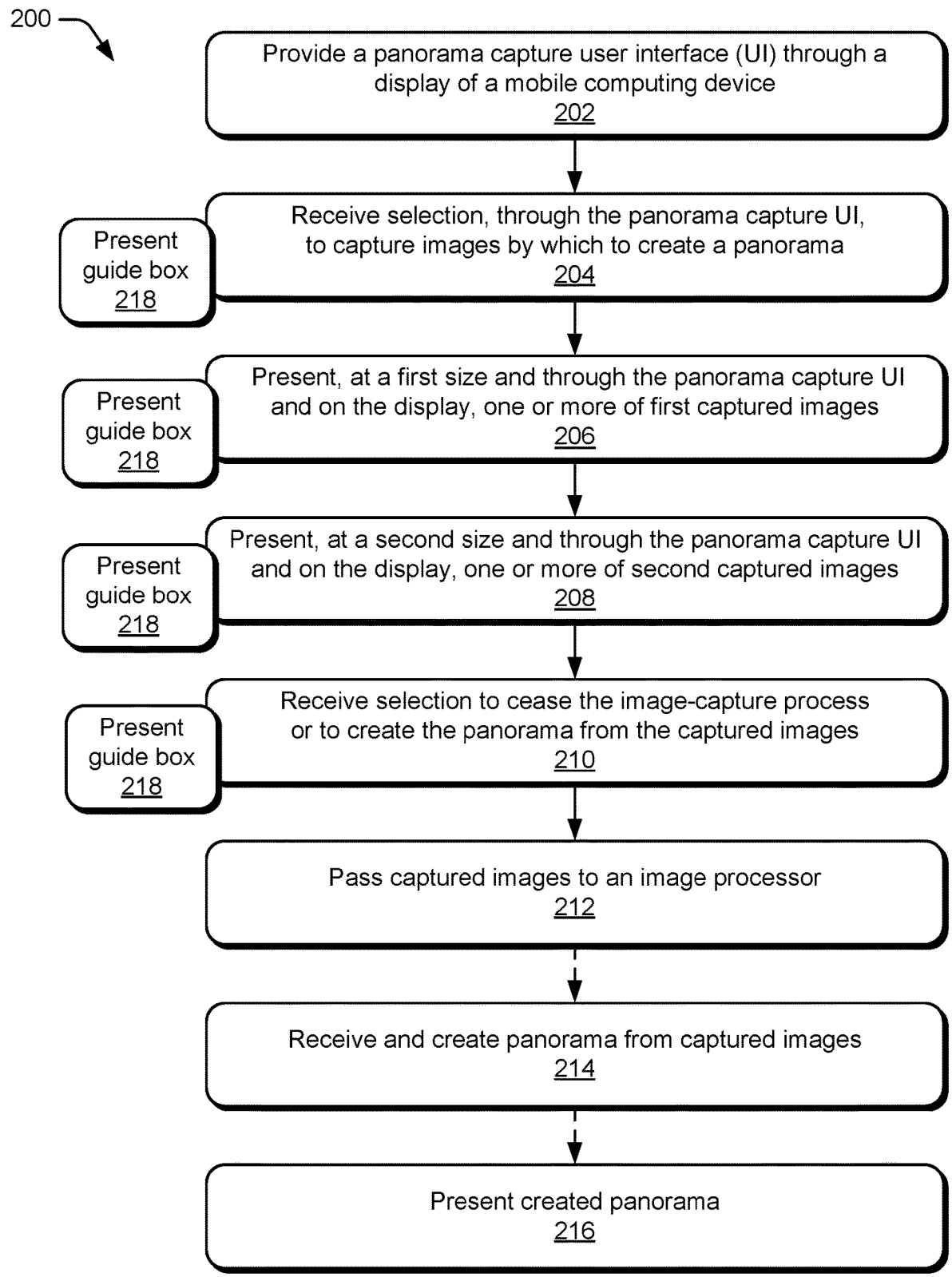
FIG. 2 illustrates an example method for enabling a scale down capture preview for a panorama capture user interface.

FIG. 2 illustrates an example method 200 for enabling a scale down capture preview for a panorama capture UI. The method 200 is described in the form of a set of blocks that specify operations that can be performed. Operations, however, are not necessarily limited to the order shown in FIG. 2 or described herein, for the operations may be implemented in alternative orders or in fully or partially overlapping manners. The example method 200 may be performed by the mobile computing device 102 of FIG. 1.

At 202, a panorama capture user interface (UI) is provided at least in part through a display of a mobile computing device. By way of an ongoing example, the panorama capture UI 114 provides a scale down preview through the display 106 of the mobile computing device 102. Optionally, this panorama capture UI 114 can also provide a user interface for capture of still images, videos, "live" still images (e.g., a still image with an associated short video taken proximate the still image), and so forth. The panorama capture UI 114 may display various selectable controls, or may instead or also allow control and selection through in-the-air gestures or audio (e.g., speech recognition), just to name two options.

Figure 3:
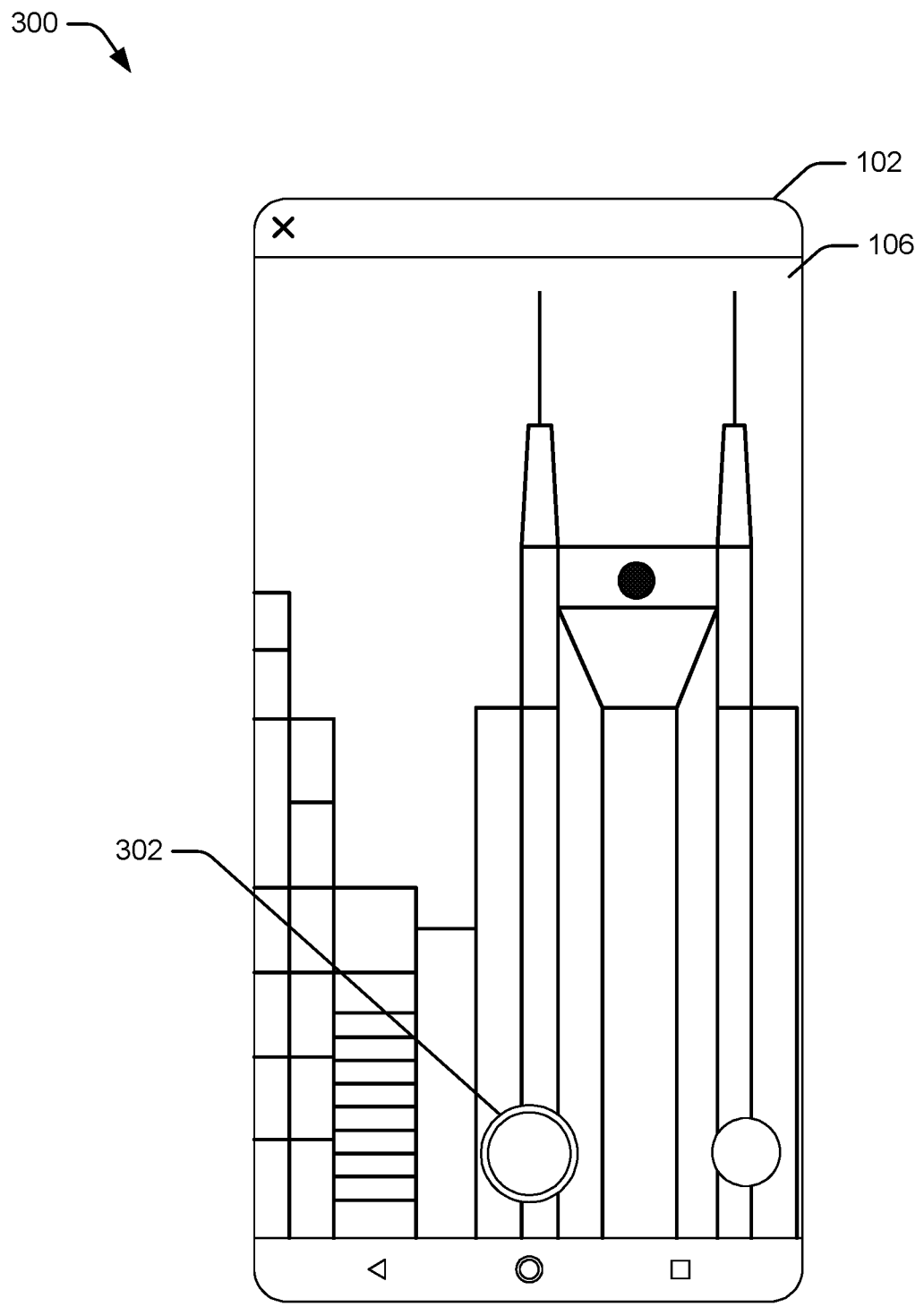
FIG. 3 illustrates example details showing a panorama capture user interface prior to selection, by a user, to initiate an image-capture process.

For example, consider a detail 300 of FIG. 3, which shows a panorama capture user interface prior to selection, by a user, to initiate an image-capture process. Here the detail 300 illustrates an example of the mobile computing device 102 and the display 106, which continues through FIGS. 5-10. A selectable touch control 302 is also illustrated, which is but one of many selection mechanisms.

At 204, a selection is received through the panorama capture UI, such as through a tap gesture on a touch display, other touch gestures, in-the-air gestures, or audio. This selection is effective to cause a mobile computing device to begin an image-capture process. Continuing the ongoing example, the panorama capture UI 114 causes the image-capture manager 112 to begin an image-capture process. This image-capture process captures images through which to create the panorama image, and may be continuously capturing or discontinuously capturing images. This process, however, progresses from a beginning to an end. Thus, at one point in time the image-capture process captures a first portion of images and at a later point in time, a second portion of images, and later a third, and so forth. Note that many images, from tens to even many hundreds or thousands of images, can be captured and used to create a panorama, as well as be used by the techniques for the preview. For example, the image-capture manager 112 may capture (with help from a user moving the mobile computing device 102) hundreds of images. The panorama capture UI 114 creates a preview of some or all of those images in the panorama capture preview as they are being captured. Note that while the images captured may include full images (e.g., square or rectangular or otherwise common for still-image capture), the images captured may instead be relatively thin vertical images (for horizontal panoramas), such as 1, 5, 10, 50, or 100 pixels in width. Doing so may, in some cases, use fewer computing resources of the mobile computing device 102.

Figure 4:
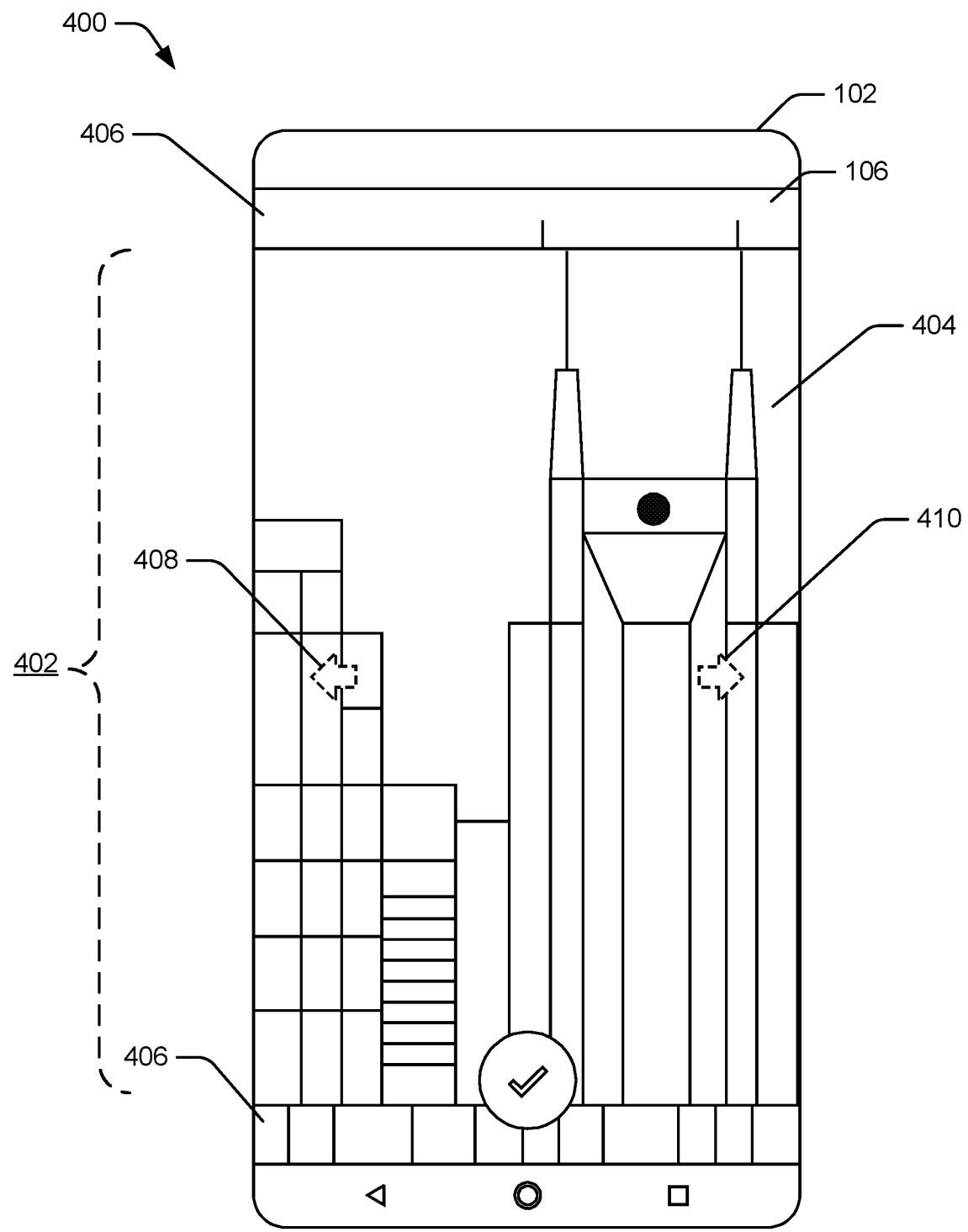
FIG. 4 illustrates example details showing a beginning of the image-capture process where a first image is presented at a large size.

Consider FIG. 4, which illustrates a detail 400 showing a scale-down panorama capture preview (panorama preview) 402 at a beginning of the image-capture process where a first image 404 is presented at a large size, here a full width of the display 106 of the mobile computing device 102. Note also that a current image 406 is shown in a background behind the first image and, as FIGS. 5-9 also illustrate, is also shown behind the panorama preview 402 (as numbered in FIG. 4; numbered 502 in FIG. 5, 602 in FIG. 6 and so on). At this first image, or prior to it, the panorama capture UI 114 may present an option to proceed left or right, shown with arrows 408 and 410 respectively. Up and down arrows may instead or also be shown to indicate a selection to create a vertical panorama (see FIGS. 12, 13-1, and 13-2).

At 206, one or more images captured during the first portion of the image-capture process are presented, through a panorama capture UI and on a display, at a first size. As noted, these first images to be captured can be captured in a continuous manner, similar to capturing video while moving the mobile computing device 102, or discontinuously.

This presentation of the images in a preview, as noted, can be performed in various different or complimentary manners. For example, consider a case where the image-capture process is a continuous process of capturing images. This continuous process progressively captures images from a beginning of the image-capture process to an end of the image-capture process. For this case, the panorama capture UI 114 can present a preview of the eventual panorama through presenting captured images progressively smaller and smaller. Thus, those captured first are first presented at a first size, and then, later, second-captured images are presented at a smaller size. Note that when the second-captured images are presented at the smaller size the size, the first-captured images may scale down (e.g., shrink to match) accordingly to be in size to the smaller size of the second-captured images. Thus, a user may see an animation, which is illustrated in FIGS. 5-9, of progressively scaled-down panorama capture previews at 502, 602, 702, 802, and 902, respectively. As shown in these figures, a height of the presented images scales down as additional images are presented and as a preview of the panorama grows. These image sizes may continue to scale down until a final presentation, which may present the images a same, final size.

While not illustrated, in some cases, such as those where a width (for a horizontal panorama) of a display is relatively small or the panorama is relatively large relative to the width of the display, a minimum size of the images may instead be used. Consider a similar case where the image-capture process is a continuous process of capturing images (still or video), having a beginning and an end. As the panorama capture UI 114 presents the images at a progressively smaller size, a minimum threshold size can be reached prior to presentation of final images of the image-capture process. In such a case, the panorama capture UI 114 may cease to present the first images or the second images (e.g., intermediate images) responsive to the threshold size being met. Instead, the techniques may drop off beginning images or may keep presenting an early-received image (e.g., a first-received image) and drop intermediate images from the panorama preview. By so doing, a user may see where he or she started the panorama, while maintaining a size useful to the user. The first or some other early-captured image can be useful to the user to aid them in knowing where (and how soon) the capture process may end if they are creating a 360-degree panorama.

Figure 11:
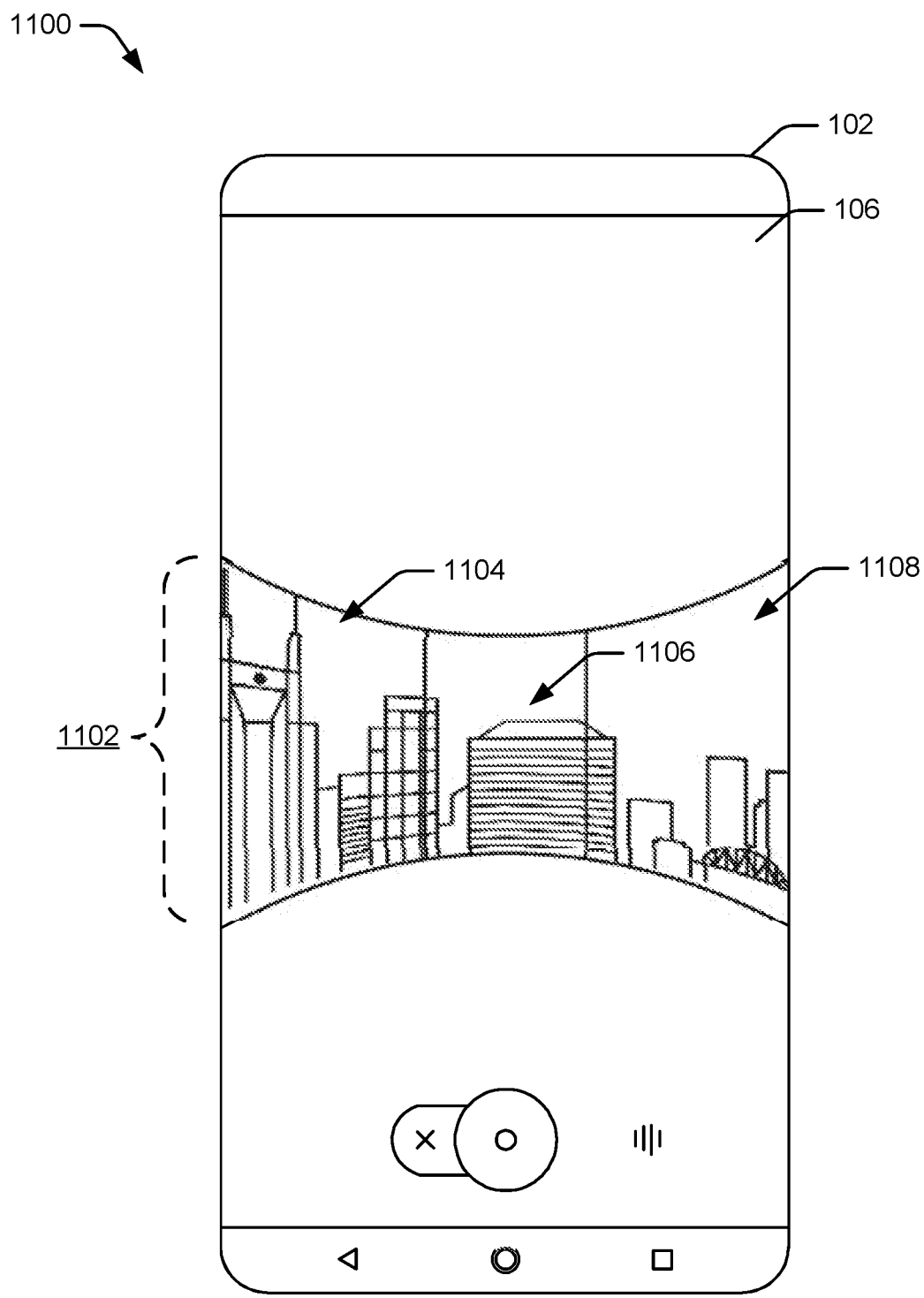
FIG. 11 illustrates a 3D preview with three regions showing captured images at three difference sizes.

Alternatively, the techniques may present a panorama preview in a three-dimensional-like view. This is illustrated in FIG. 11 at user interface 1100, which shows a final presentation just after selection to finish the capture process. As illustrated, at a final presentation of the captured images of the image-capture process, the first size is larger than the second size, and a last size of a last image captured during the image-capture process is larger than the second size.

Note that the preview shown in FIGS. 5-9 each show the images of the previews (see 502, 602, 702, 802, and 902) occupying all or substantially all of a display's width. This can also be the case for a height of a display for a vertical panorama. Note that in these cases there is also no unfilled black band, which can cause user's anxiety.

Returning to method 200, at 208 one or more of the second images of the second portion of the image-capture process are presented. These second images are captured after the first images, and are presented in the panorama preview at a second size that is smaller than the first size at which the first images were presented. This is illustrated in FIGS. 6-9 and for the 3D preview also in FIG. 11 (shown in a middle portion of the display).

At 210, selection is received through the panorama capture UI to cease the image-capture process or to create the panorama from the captured images. As noted, this reception can be through various audio, gesture, touch input and so forth. It may also be passive in the sense that a pre-selected panorama size may be met (such as 360 degrees) and therefore the image-capture manager 112 may cease to capture images.

At 212, the captured images are passed to an image processor, such as the image processor 116. This passing can be through a network to a remote computing device or trivially to an image processor operating on a same device as that which captured the images.

Optionally at 214, the image processor 116 receives the captured images (again, which may be trivial if the image processor 116 is executing on the mobile computing device 102), and creates the panorama. This created panorama may be created at a higher resolution, faster, or with fewer resources through use of the scale down preview for a panorama capture user interface.

Optionally at 216, the panorama created from the captured images is presented on a display, such as the display 106 of the mobile computing device 102.

In addition to the scale down preview, a visual guide may be used as part of the scale down preview. This visual guide can be a box (e.g., a rectangle similar in size to a currently presented image size in the preview) or other manners, such as bars, arrows, pointers, animated graphic, tilted lines, and so forth.

This operation is shown at 218 in method 200. At 218, a guide box is presented, which can be presented throughout the image-capture process (shown as optional for operations 204, 206, 208, and 210). This guide box is superimposed over at least a portion of the images presented through the panorama capture UI and on the display, the guide box indicating, to a user of the mobile computing device, a desired speed, up-and-down position, or cant at which to move or hold the mobile computing device. This is illustrated in FIGS. 5-9.

Figure 5:
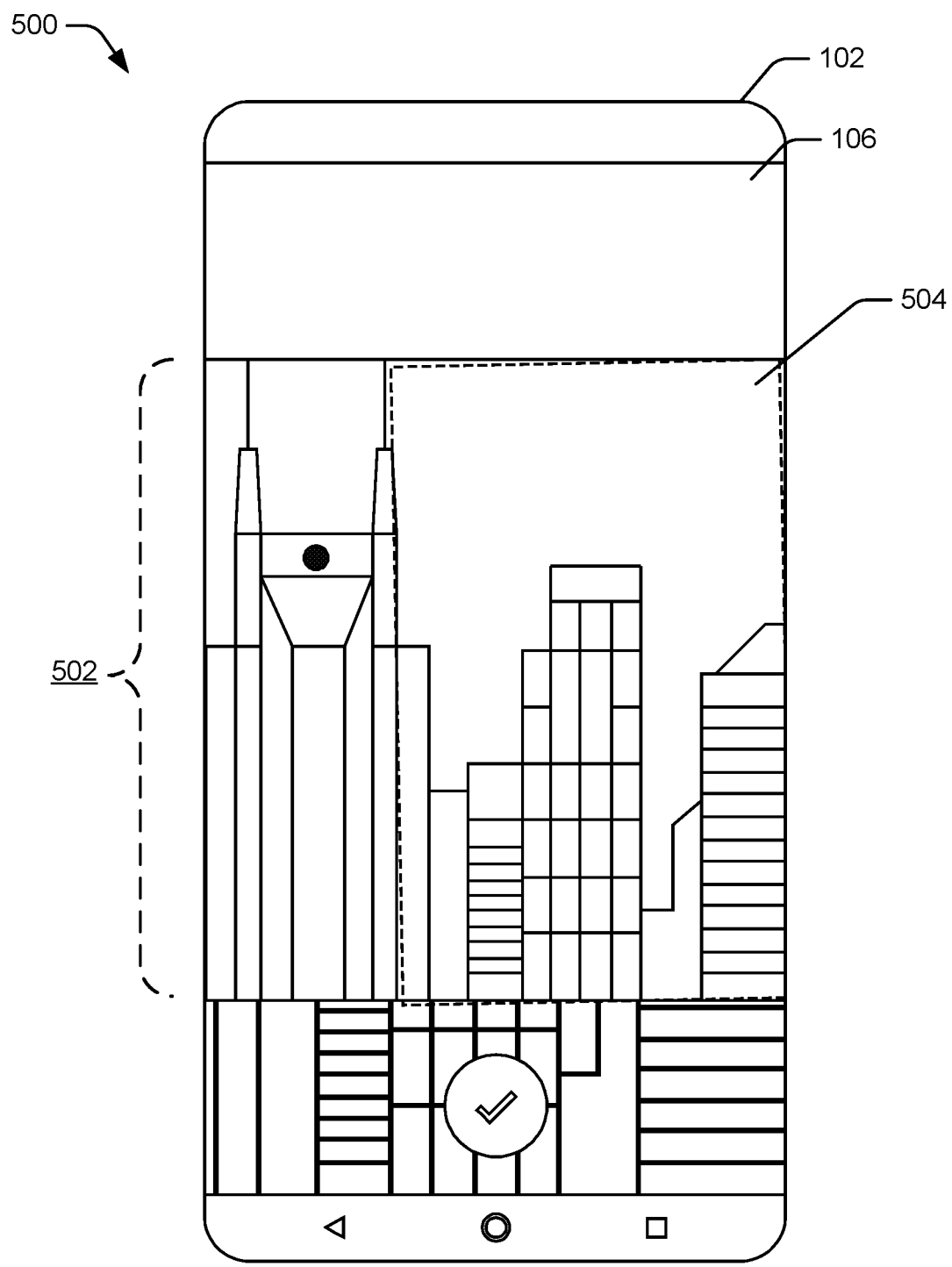
FIGS. 5-9 illustrates example details showing images of previews of a panorama, as well as visual guides.

In FIG. 5, a detail 500 shows the progressively scaled-down panorama capture preview 502, as noted above, and a guide box 504 at a slight cant. No additional guides to indicate a need for the user to correct this cant are shown, in this case due to the cant being minor.

Figure 6:
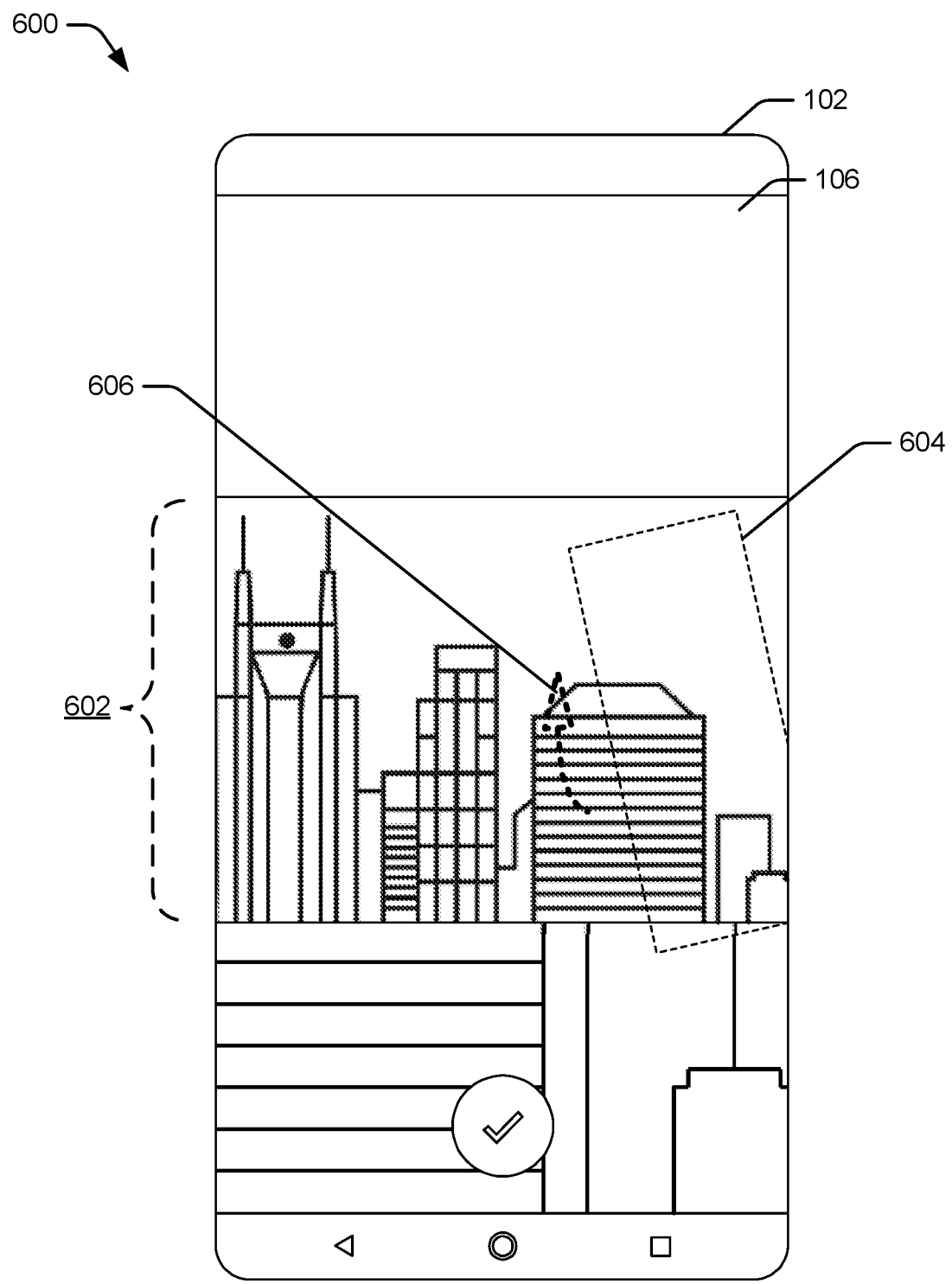

In FIG. 6, a detail 600 shows the progressively scaled-down panorama capture preview 602, as noted above, and a guide box 604 at a high cant. An additional guide, here a bent arrow 606 indicating, along with an angle of the guide box 604, that correction of this cant is requested of the user. In more detail, the guide box 604 indicates a change is desired to a cant of the mobile computing device as part of the image-capture process. As noted in part above, this correction may improve speed and resolution because cant reduces resolution at a top or bottom of a horizontal panorama.

Figure 7:
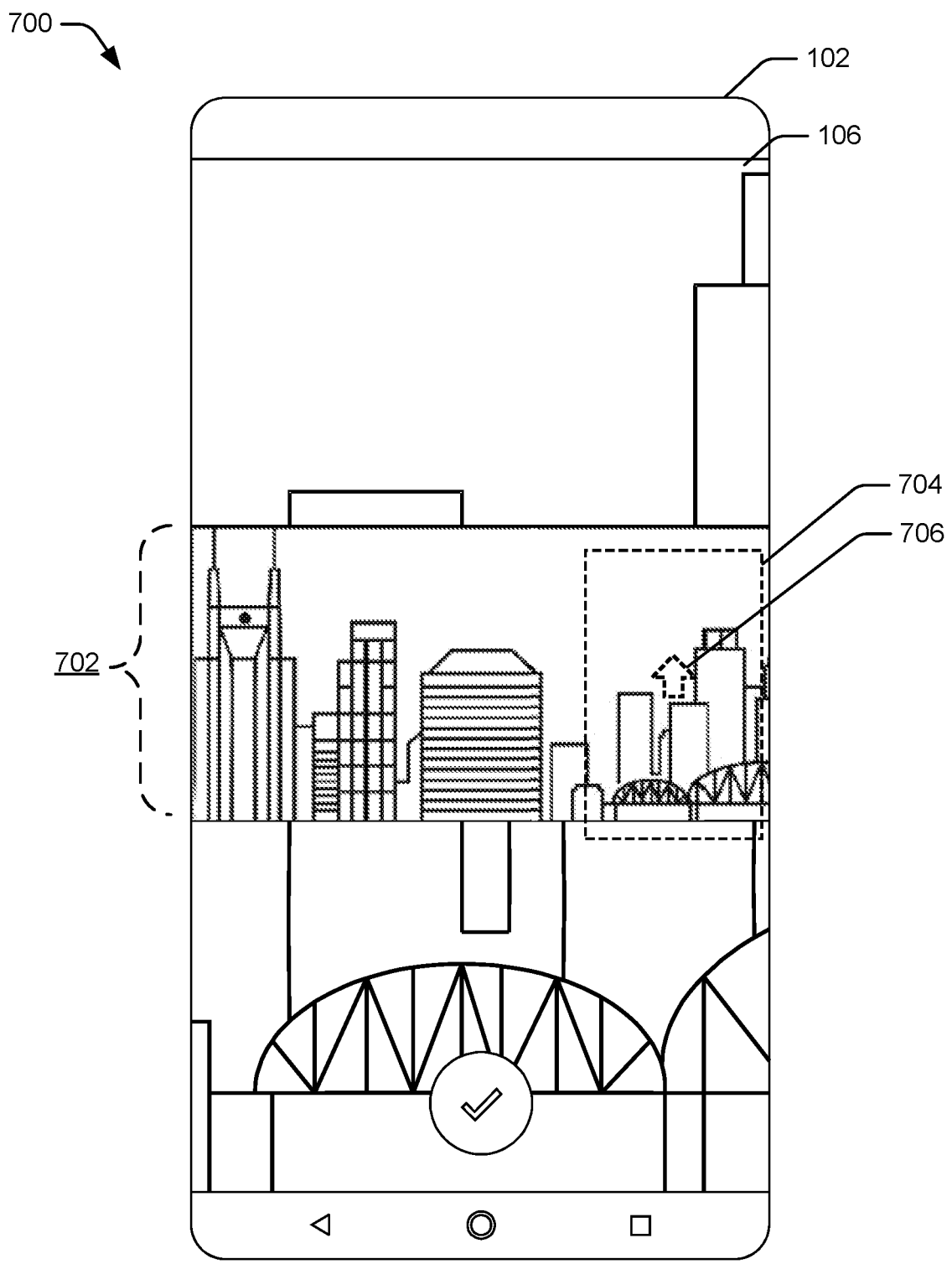

In FIG. 7, a detail 700 shows the progressively scaled-down panorama capture preview 702, as noted above, and a guide box 704 indicating, here with a lower location of the box relative to a recently-presented image, that a change to an up-and-down position is needed. Here the guide box 704, as well as an arrow up 706, indicate to a user to move the mobile computing device 102 upward as part of the image-capture process. In more detail, when an up-and-down position is far enough off from a desired position to reduce an eventual panorama's quality, waste resources, or waste a user's time, the techniques guide the user to correct the position. The desirable position can be one or both of an angular position causing the capture of images to deviate, or a vertical or horizontal position also causing the capture of images to deviate. These deviations are inconsistencies relative to a trajectory of captured images for a desired panorama (e.g., generally horizontal for a horizontal panorama and generally vertical (90 degrees) for a vertical panorama). The user may correct the position by moving the mobile computing device vertically (for the horizontal panorama), but the error, and the correction, may instead be an angular position. Therefore, the up-and-down position can be corrected with a change to an angle at which the mobile computing device is held.

Figure 8:
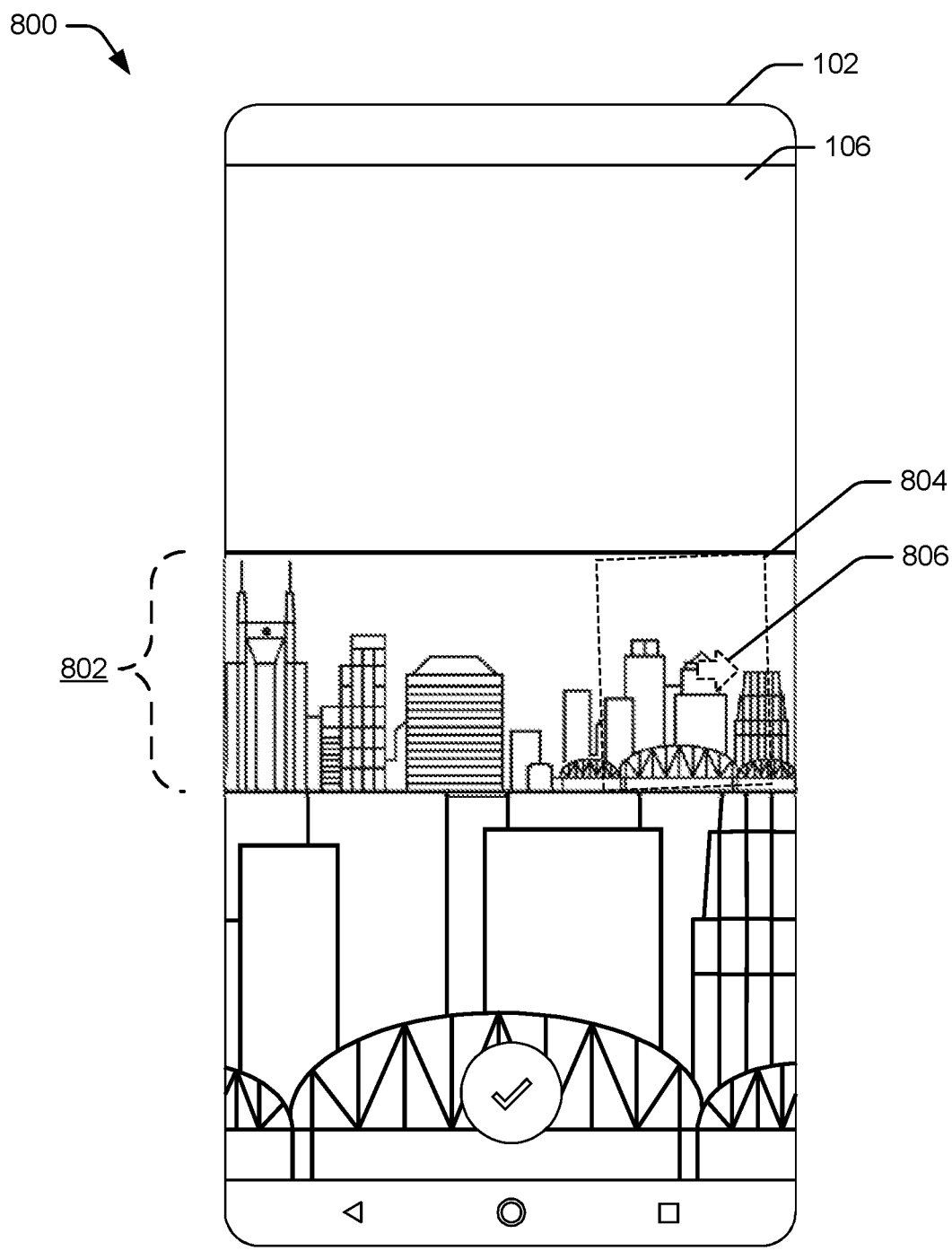

In FIG. 8, a detail 800 shows the progressively scaled-down panorama capture preview 802, as noted above, and a guide box 804 indicating with a leftward location of the guide box 804 relative to a recently-presented image, that a change to a speed at which to move the mobile computing device 102 is requested. Here the guide box 804, as well as a rightward arrow 806, indicate to a user to move more quickly to the right, (e.g., to speed up) the movement of the mobile computing device 102.

Figure 9:
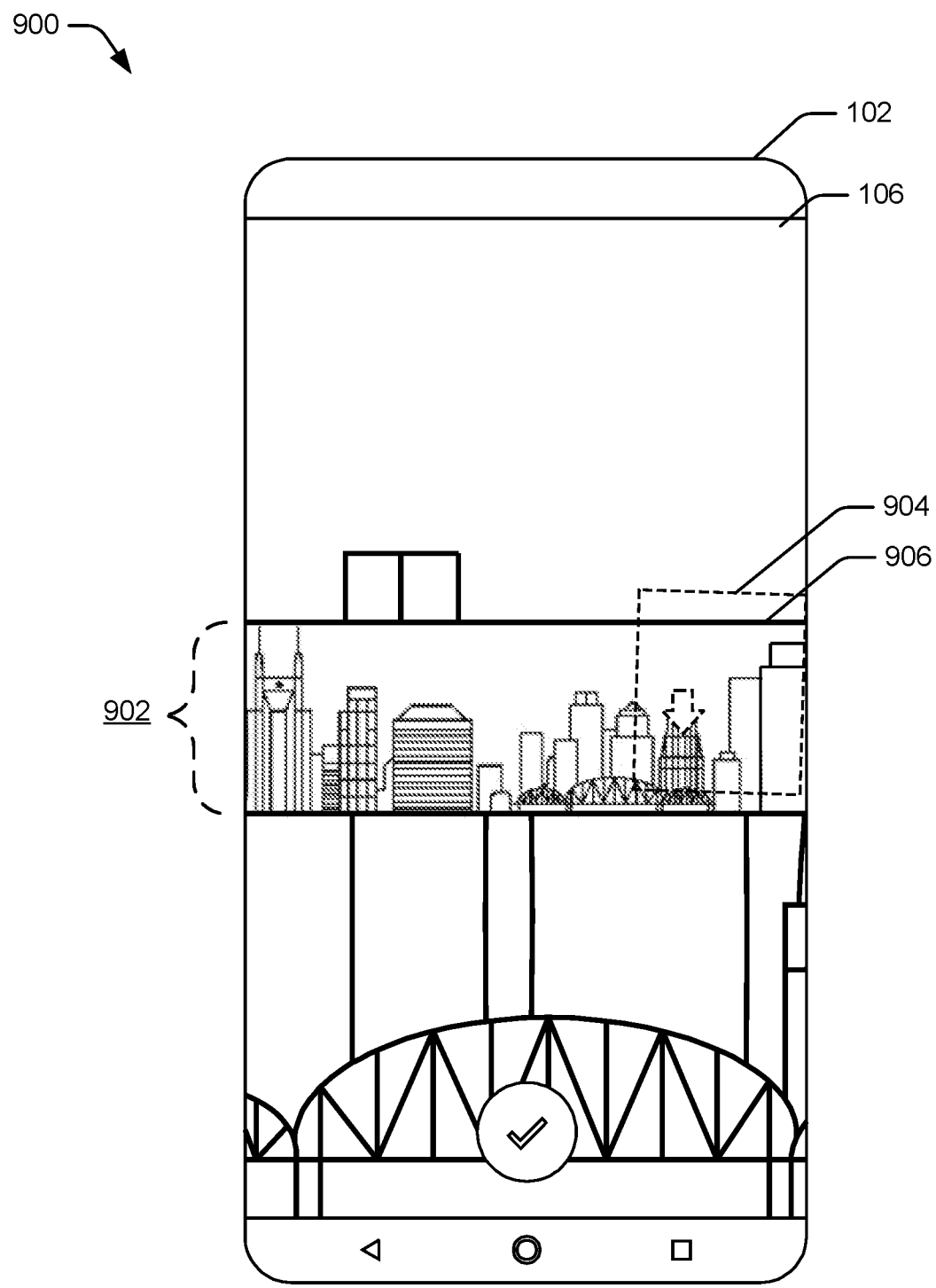

Similarly to FIG. 7, at FIG. 9, a detail 900 shows the progressively scaled-down panorama capture preview 902, as noted above, and a guide box 904 indicating, here with a higher location of the guide box 904 relative to a recently-presented image, that a change to an up-and-down position is requested. The guide box 904, as well as a down arrow 906, indicate to a user to move the mobile computing device 102 downward as part of the image-capture process.

Alternatively or in addition, the techniques may provide other visual guidance to a user to aid the user in making changes. For example, consider FIG. 10, which includes a detail 1000 showing multiple visual guides for addressing cant.

Figure 10:
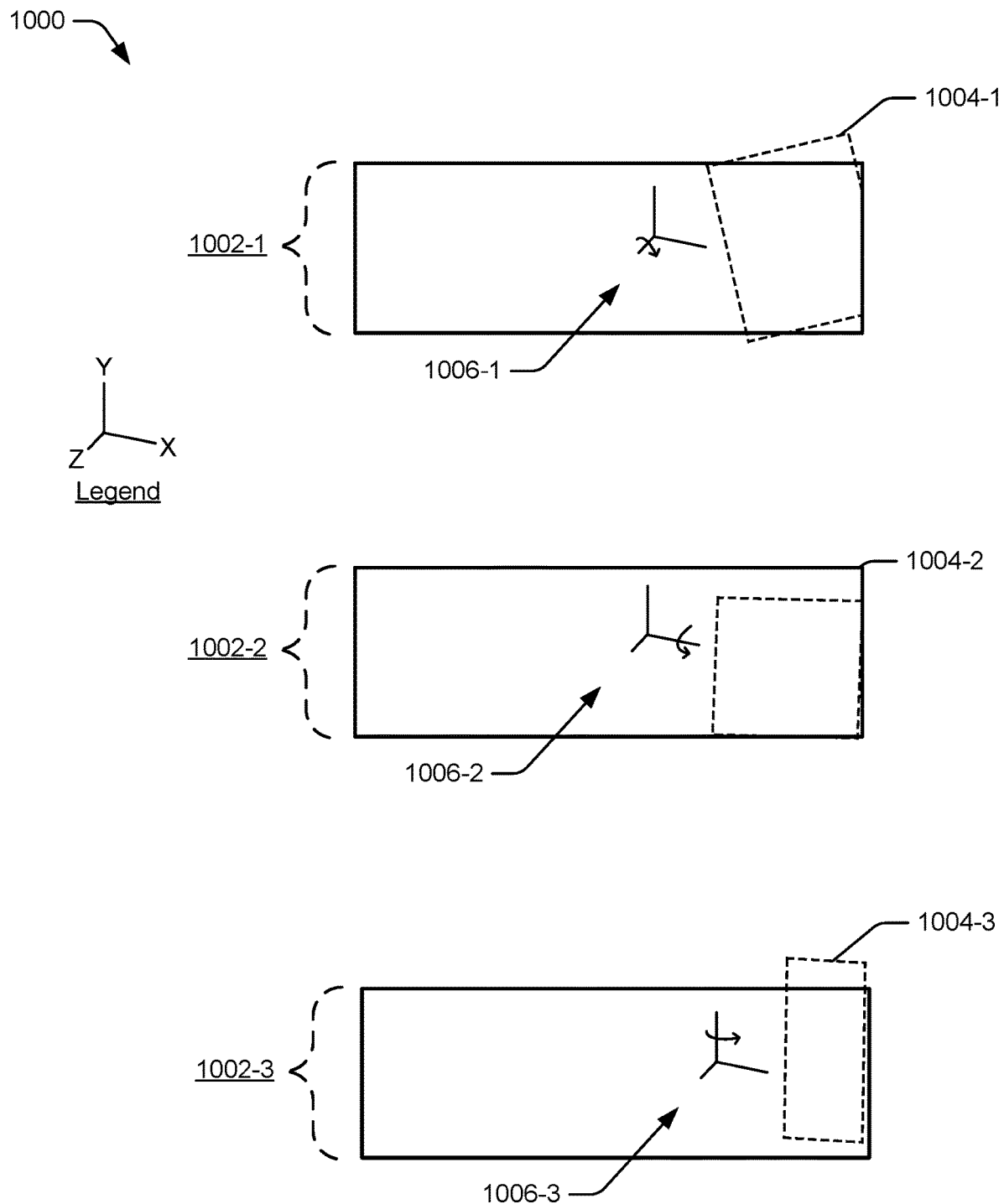
FIG. 10 shows a detail with visual guides to aid a user in correcting cant.

In FIG. 10, three examples of a scaled-down panorama capture preview 1002-1, 1002-2, and 1002-3 are shown (without captured images, for visual clarity). Each of these previews 1002 includes two visual guides to aid a user in correcting an undesirable amount of cant. Three of these visual guides show a change to an angular position in three dimensions (see Legend), a Z-axis cant correction guide 1004-1, an X-axis cant correction guide 1004-2, and an Y-axis cant correction guide 1004-3. Each includes an arrow indicating, along with the axis, a change requested. Thus, for the Z-axis cant correction guide 1004-1, the panorama capture UI 114 indicates, in an easy-to-use way, that the mobile computing device should be tilted clockwise. Each of these requested changes can also or instead be shown with a guide box 1006-1, 1006-2, and 1006-3, respectively.

For the X-axis cant correction guide 1004-2, the panorama capture UI 114 indicates that a bottom region of the mobile computing device should be tilted toward the scene being captured. This is also shown with the guide box 1006-2, which shows, with a compressed height relative to other visual guides (see FIGS. 5-9) and with space shown between a top of the scaled-down panorama capture preview 1002-2 and the guide box 1006-2, that the currently captured image is too low, and thus this angular correction along the X axis will correct the deviation.

Lastly, for the Y-axis cant correction guide 1004-3, the panorama capture UI 114 indicates that a right region of the mobile computing device should be tilted toward the scene being captured. This is also shown with the guide box 1006-3, which shows, with a compressed width relative to other visual guides (see FIGS. 5-9), that the currently captured image is too narrow, and thus this angular correction along the X axis will correct the deviation.

FIG. 11 illustrates a detail 1100 showing a 3D panorama capture preview 1102, here with a first region 1104 of first images shown larger than a second region 1106 of second images, and with a third region 1108 of third images larger than the second and similar to the first region's image size.

Figure 12:
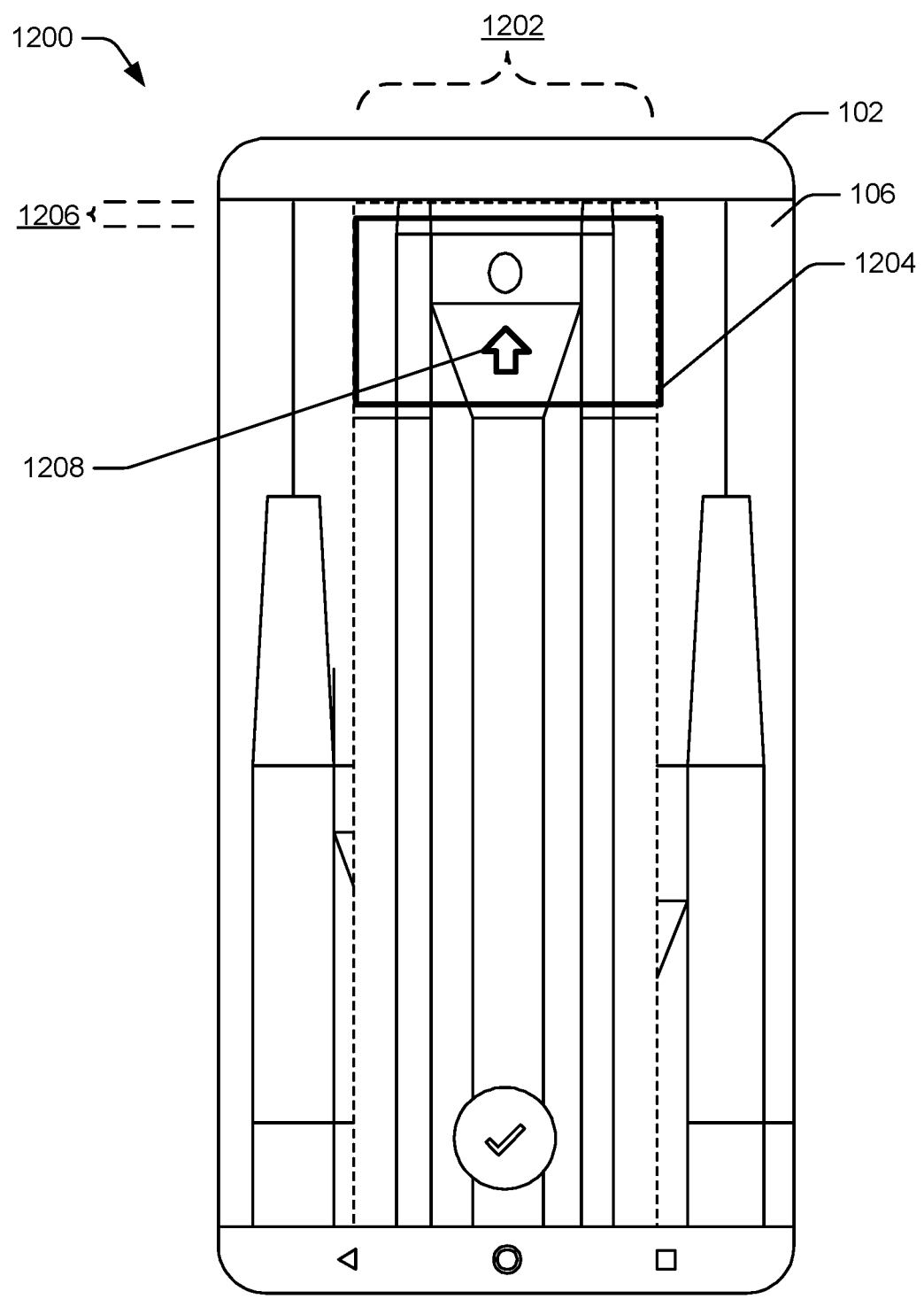
FIG. 12 illustrates a detail showing a vertical panorama capture preview.

FIG. 12 illustrates a detail 1200 showing a vertical panorama capture preview 1202 and a guide box 1204 indicating a change to a speed at which the user is moving the mobile computing device 102. This indication is shown both with the guide box 1204 being located below a top edge 1206 of the display 106, and also with an arrow 1208. The vertical panorama capture preview 1202 is shown near an end of an image-capture process (assuming a roughly 90-degree panorama to capture a tall building). Other guides may also be used, such as those similar to the guides set forth for the horizontal panorama previews above.

Figures 1, 13:
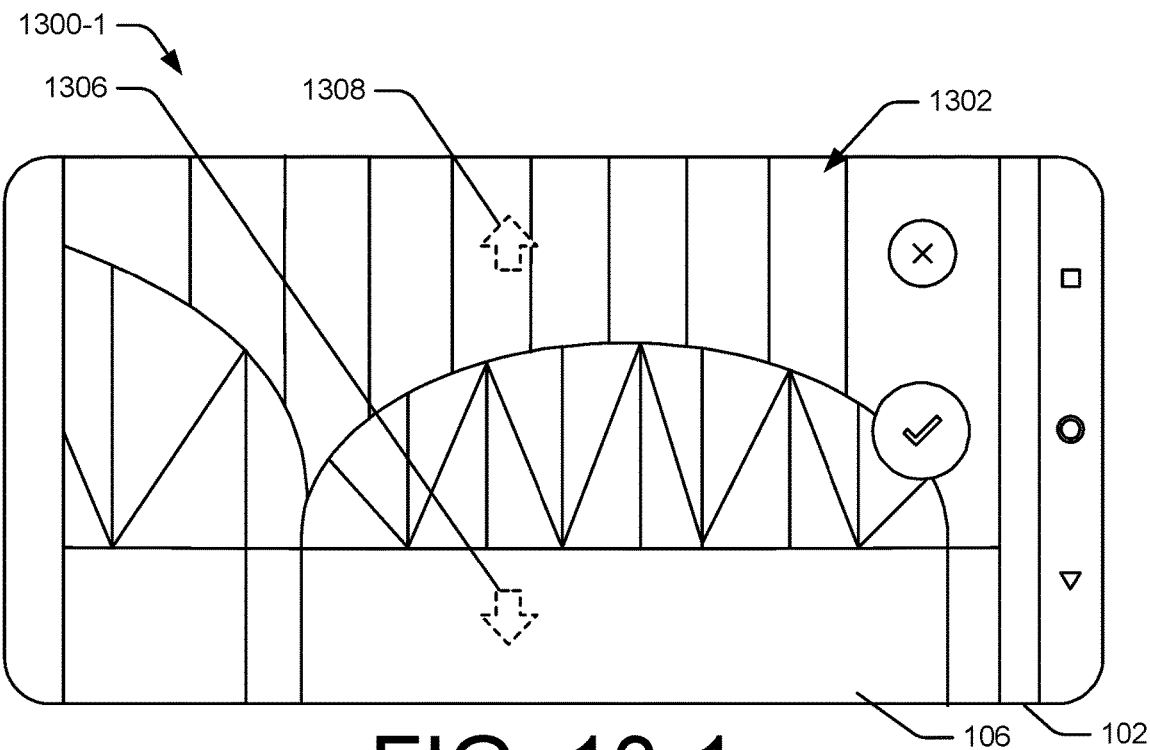
Figures 2, 13:
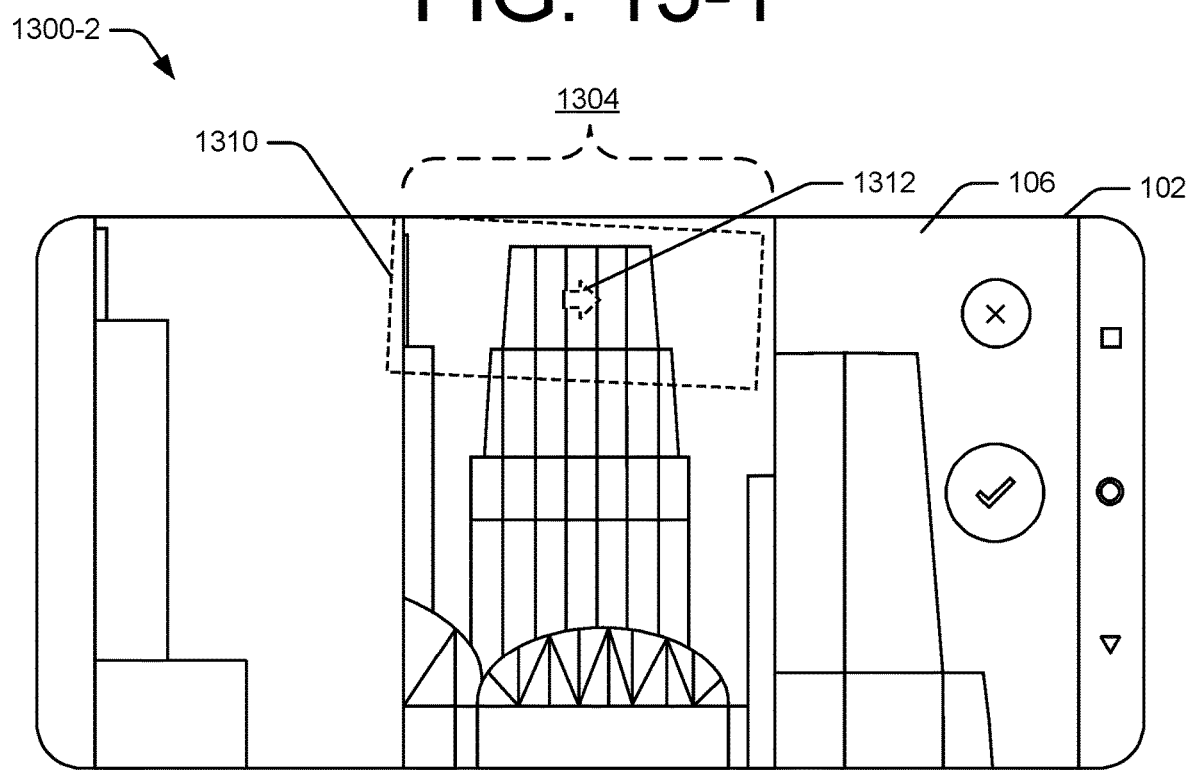

FIGS. 13-1 and 13-2 illustrate details 1300-1 and 1300-2 showing a vertical panorama capture UI 1302 just after selection by a user to initiate an image-capture process and a vertical panorama capture preview 1304 after the image-capture process has captured most of a desired vertical panorama, respectively. The panorama capture UI 1302 illustrates directional arrows 1306 and 1308 to indicate directions to begin capturing images, vertically moving down or vertically moving up, respectively. The detail 1300-2 also shows a guide box 1310 at a moderate cant and positioned left of the vertical panorama capture preview

1304. An additional guide, here an arrow 1312, indicates, along with the position of the guide box 1310 left of the vertical panorama capture preview 1304, that a change is desired to move the mobile computing device 102 to the right or to angle the mobile computing device 102 sufficient to capture images consistent with the ongoing trajectory of the desired panorama. As noted, the moderate cant of the mobile computing device 102's camera is shown with the guide box 1310, which indicates that some change is desired. In this case, however, an additional indicator (e.g., the bent arrow 606 of FIG. 6) is not shown, as the cant does not warrant additional guidance, which, while often desirable, may reduce the ease-of-use for the user.

Various technical benefits which may be provided by the panorama capture UI have been described. In addition to those benefits, the panorama capture UI may also correct other failings with conventional panorama capture UIs. For instance, conventional UIs, by providing a black band with images filling the black band from the left or right as the panorama is captured, may give the user an impression that the entire black band must be filled, which is both inaccurate and can cause user anxiety. This is not an issue with the panorama capture UI described herein, which does not give users an impression that a particular quantity of images or set size is required for the panorama.

Although techniques using, and apparatuses for implementing a scale down capture preview for a panorama capture user interface have been described, it is to be understood that the subject of the appended claims is not necessarily limited to the specific features or methods described. Rather, the specific features and methods are disclosed as example ways the scale down capture preview for the panorama capture user interface can be implemented.

What is claimed is:

1. A computer-implemented method, comprising:
   receiving, by a user interface (UI) of a computing device, a selection to capture images to generate a panorama image, the received selection effective to cause the computing device to begin an image-capture process to generate the panorama image, the image-capture process having been configured to capture a plurality of images, and the image-capture process having a first portion capturing a plurality of first images and a second portion capturing a plurality of second images, the first portion captured prior to the second portion;
   providing, by the UI, a preview of the panorama image during the image-capture process, wherein the providing of the preview comprises providing an early-received image from the first portion and dropping one or more later-received images from the first portion, the early-received image having been captured prior to the one or more later-received images, and dropping one or more intermediate images of the plurality of images to fit the panorama image within at least one of a width or a height of a display of the computing device;
   receiving, by the UI, an indication that the image-capture process has been completed; and
   providing, by the UI, the generated panorama image comprising images from the first portion and the second portion.

2. The computer-implemented method of claim 1, wherein the providing of the generated panorama image further comprises:
   processing, by an image processor, images captured during the image-capture process to generate the panorama image.

3. The computer-implemented method of claim 1, wherein the indication that the image-capture process has been completed comprises at least one of a first selection to cease the image-capture process or a second selection to generate the panorama image.

4. The computer-implemented method of claim 1, further comprising:
   providing, by the UI, one or more of the plurality of first images captured during the first portion of the image-capture process at a first size; and
   providing, by the UI, one or more of the plurality of second images captured during the second portion of the image-capture process at a second size, the second size smaller than the first size.

5. The computer-implemented method of claim 4, wherein the image-capture process is a continuous process of capturing images, the continuous process progressively capturing images from a beginning of the image-capture process to an end of the image-capture process,
   wherein sizes at which the progressively captured images are provided are progressively smaller, and
   wherein the first size and the second size are two of multiple progressively smaller sizes.

6. The computer-implemented method of claim 5, wherein the sizes at which the progressively captured images are provided are progressively smaller until a threshold size, the threshold size met prior to the providing of the generated panorama image.

7. The computer-implemented method of claim 4, wherein the plurality of first images are progressively reduced in size to match the second size.

8. The computer-implemented method of claim 4, wherein a final size of the plurality of first images and the plurality of second images is identical.

9. The computer-implemented method of claim 1, further comprising:
   providing, by the UI, a visual guide, the visual guide superimposed over at least a portion of the images provided by the UI, the visual guide configured to indicate, to a user of the computing device, a desired change to an angular position of the computing device in three dimensions.

10. The computer-implemented method of claim 9, wherein the desired change to an angular position of the computing device in three dimensions further comprises at least one of:
    a change to a cant to hold the computing device, or
    a change to a cant to move the computing device.

11. The computer-implemented method of claim 9, wherein the visual guide comprises a guide box, and wherein the desired change to an angular position of the computing device in three dimensions is indicated by:
    providing the guide box at an angle oblique to an angle of the one or more of the plurality of images; and
    providing a bent arrow indicating the desired change to an angular position of the computing device in three dimensions.

12. The computer-implemented method of claim 1, further comprising:
    providing, by the UI, a visual guide, the visual guide superimposed over at least a portion of the images provided by the UI, the visual guide configured to indicate, to a user of the computing device, a desired change to a speed at which to move the computing device.

13. The computer-implemented method of claim 1, further comprising:
providing, by the UI, a visual guide, the visual guide superimposed over at least a portion of the images provided by the UI, the visual guide configured to indicate, to a user of the computing device, a desired change to an up-and-down position to move the computing device.

14. An apparatus comprising:
a camera;
a processor; and
computer-readable storage media having stored instructions that, responsive to execution by the processor, cause the processor to perform operations comprising:
receiving, by a user interface (UI) of the camera, a selection to capture images to generate a panorama image, the received selection effective to cause the camera to begin an image-capture process to generate the panorama image, the image-capture process having been configured to capture a plurality of images, and the image-capture process having a first portion capturing a plurality of first images and a second portion capturing a plurality of second images, the first portion captured prior to the second portion;
providing, by the UI, a preview of the panorama image during the image-capture process, wherein the providing of the preview comprises providing an early-received image from the first portion and dropping one or more later-received images from the first portion, the early-received image having been captured prior to the one or more later-received images, and dropping one or more intermediate images of the plurality of images to fit the panorama image within at least one of a width or a height of a display of the computing device;
receiving, by the UI, an indication that the image-capture process has been completed; and
providing, by the UI, the generated panorama image comprising images from the first portion and the second portion.

15. The apparatus of claim 14, wherein the operations for the providing of the generated panorama image further comprise operations for:
processing, by an image processor, images captured during the image-capture process to generate the panorama image.

16. The apparatus of claim 15, wherein the operations for the processing of the images further comprise operations for dropping one or more intermediate images of the plurality of images to fit the panorama image within at least one of a width or a height of a display of the camera.

17. The apparatus of claim 14, wherein the indication that the image-capture process has been completed comprises at least one of a first selection to cease the image-capture process or a second selection to generate the panorama image.

18. The apparatus of claim 14, the operations further comprising:
providing, by the UI, one or more of the plurality of first images captured during the first portion of the image-capture process at a first size; and
providing, by the UI, one or more of the plurality of second images captured during the second portion of the image-capture process at a second size, the second size smaller than the first size.

19. An article of manufacture comprising one or more non-transitory computer readable media having computer-readable instructions stored thereon that, when executed by one or more processors of a computing device, cause the computing device to carry out functions comprising:
receiving, by a user interface (UI) of the computing device, a selection to capture images to generate a panorama image, the received selection effective to cause the computing device to begin an image-capture process to generate the panorama image, the image-capture process having been configured to capture a plurality of images, and the image-capture process having a first portion capturing a plurality of first images and a second portion capturing a plurality of second images, the first portion captured prior to the second portion;
providing, by the UI, a preview of the panorama image during the image-capture process, wherein the providing of the preview comprises providing an early-received image from the first portion and dropping one or more later-received images from the first portion, the early-received image having been captured prior to the one or more later-received images, and dropping one or more intermediate images of the plurality of images to fit the panorama image within at least one of a width or a height of a display of the computing device;
receiving, by the UI, an indication that the image-capture process has been completed; and providing, by the UI, the generated panorama image comprising images from the first portion and the second portion.

* * * * *